(12) United States Patent
Wang et al.

(10) Patent No.: US 10,351,666 B2
(45) Date of Patent: Jul. 16, 2019

(54) CATALYTIC COMPOSITION FOR PREPARING PET RESIN

(71) Applicants: ALMIGHTY GREEN MATERIAL INC., Tainan (TW); CHUNG HOW PAINT FACTORY CO., LTD., Tainan (TW)

(72) Inventors: Wen-Ting Wang, Tainan (TW); Sung-Jeng Jong, Tainan (TW); Pao-Tang Chung, Tainan (TW)

(73) Assignees: Almighty Green Material Inc., Tainan (TW); Chung How Paint Factory Co., Ltd., Tainan (TW)

( * ) Notice: Subject to any disclaimer, the term of this patent is extended or adjusted under 35 U.S.C. 154(b) by 0 days.

(21) Appl. No.: 15/437,747

(22) Filed: Feb. 21, 2017

(65) Prior Publication Data

US 2018/0009939 A1  Jan. 11, 2018

(30) Foreign Application Priority Data

Jul. 6, 2016 (TW) .............................. 105121387 A

(51) Int. Cl.
*C08L 67/02* (2006.01)
*C08G 63/183* (2006.01)
(Continued)

(52) U.S. Cl.
CPC ............. *C08G 63/85* (2013.01); *C08G 63/82* (2013.01); *C08G 63/83* (2013.01); *C08K 3/22* (2013.01);
(Continued)

(58) Field of Classification Search
None
See application file for complete search history.

(56) References Cited

U.S. PATENT DOCUMENTS 5,453,479 A * 9/1995 Borman ................ C08G 63/85
525/439
6,593,447 B1  7/2003 Yamamoto
(Continued)

FOREIGN PATENT DOCUMENTS

CN  102153839 B  9/2012
TW  I386430 B1  2/2013

OTHER PUBLICATIONS

Lorenzo, M. et al. "Thermal and morphological characterization of poly(ethylene terephthalate)/calcium carbonate nanocomposites". J. Mater. Sci. 2002, 37, 2351-2358. (Year: 2002).*

*Primary Examiner* — Richard A Huhn
(74) *Attorney, Agent, or Firm* — Rosenberg, Klein & Lee

(57) ABSTRACT

A catalytic composition for preparing a polyethylene terephthalate (PET) resin is provided. The catalytic composition comprises a polycondensation catalyst and cesium tungsten oxide ($Cs_xWO_{3-y}Cl_y$), and $0<x\leq 1$ and $0\leq y\leq 0.5$. A PET resin prepared by the catalytic composition above is also provided. The PET resin comprises 2-80 ppm of cesium tungsten oxide. This catalytic composition can solve the problems of slow solid-state polymerization rate of the PET preparation and thus the long preparation time, as well as yellowing. Moreover, the PET resin can absorb infrared radiation.

2 Claims, 2 Drawing Sheets
(1 of 2 Drawing Sheet(s) Filed in Color)

(51) Int. Cl.
*C08K 3/105* (2018.01)
*C08G 63/85* (2006.01)
*C08K 3/22* (2006.01)
*C08G 63/82* (2006.01)
*C08G 63/83* (2006.01)
*C08G 63/127* (2006.01)
*B01J 31/02* (2006.01)

(52) U.S. Cl.
CPC ......... *B01J 31/0212* (2013.01); *C08G 63/127* (2013.01); *C08G 63/183* (2013.01); *C08G 2390/00* (2013.01); *C08K 3/105* (2018.01); *C08K 2003/2258* (2013.01); *C08K 2201/00* (2013.01); *C08L 67/02* (2013.01); *C08L 2203/10* (2013.01); *C08L 2666/54* (2013.01)

(56) References Cited

U.S. PATENT DOCUMENTS

| | | | |
|---|---|---|---|
| 8,901,271 | B2 | 12/2014 | Al-Munif et al. |
| 8,945,695 | B2 | 2/2015 | Jen |
| 2009/0035502 | A1 | 2/2009 | Tammaji et al. |
| 2011/0292502 | A1* | 12/2011 | Meyer ................ C08K 3/04 359/359 |
| 2019/0040251 | A1* | 2/2019 | Kobayashi ............ C08K 3/22 |

* cited by examiner

US 10,351,666 B2

CATALYTIC COMPOSITION FOR PREPARING PET RESIN

BACKGROUND

Field of Invention

The disclosure relates to a catalytic composition. More particularly, the disclosure relates to a catalytic composition that can increase solid-state polymerization rate of the PET preparation to shorten the preparation time, as well as improve the yellowing problem.

Description of Related Art

PET resin is a common polyester used in the package containers. The containers made from PET can have advantages of good strength, good transparency, and chemical resistance. Conventional process for preparing PET resins includes 3 stages of esterification, condensation, and solid-state polymerization.

In the available processes, heavy metal Sb is usually used as the catalyst in the condensation stage. For example, a patent published number US 20090035502 A1 (polymeric composition suitable for manufacturing pasteurizable containers) disclosed a polymeric composition of PET/PEN copolyester comprising 10-100 ppm of tungsten trioxide having a diameter of 2-20 μm. The tungsten trioxide is an additive of the reheating step, and the catalyst may be a compound containing Sb, Ti, or Ge. A patent issued number U.S. Pat. No. 8,901,271 B2 (process for making polyethylene terephthalate) disclosed that the condensation reaction used a catalyst of Ti—Zn—Sb system. Therefore, the use of Sb metal to be the catalyst is quite common. However, there are many problems to use Sb as the condensation catalyst, such as environmental pollution caused by solutions. Moreover, the reaction to rate of the condensation reaction is quite slow, and a higher content of Sb is thus needed to give a higher cost.

To solve the problems above, some processes use Ti, instead of Sb, to be the condensation catalyst to avoid using Sb. For example, a patent issued number TWI386430 B (PET resin not containing Sb heavy metal and PET fibers made thereby) and a patent issued number U.S. Pat. No. 8,945,695 B2 (Polyethylene terephthalate resin synthesized inorganic Ti—Mg catalyst and its applications thereof) respectively disclosed that an inorganic Ti—Mg catalyst in a molar ratio of 0.01-0.2 or 0.005-0.25 was used to replace the Sb catalyst to prepare PET resin without containing Sb heavy metal. In addition, a patent number U.S. Pat. No. 6,593,447 B1 (catalyst for polyester production and process for producing polyester with the same) disclosed an organic titanium compound and a phosphorus compound in a molar ratio of 1:1 to 1:4 that is mixed with ethylene glycol for preparing a catalyst solution. An anhydride was added at 200° C. to react with the catalyst solution to prepare the condensation catalyst.

The method of using Ti catalyst to replace Sb catalyst above has advantages of fast condensation rate and no heavy metal contained in the obtained PET resin. However, when the Ti catalyst is used to prepare PET resin, the solid-state polymerization rate is still slower, and a longer process time is thus needed. In addition, the color of the obtained PET resin is still yellowish.

Furthermore, when the PET resin is processed to form containers, such as bottles, the PET resin has to be cut into pellets and then form parison by injection molding. Next, infrared radiation is used to heat the PET parison to a certain temperature higher than the glass transition temperature of the PET. Finally, the PET parison is stretched and blown to form the bottle with the needed shape. Therefore, if the IR absorption ability of the PET resin can be increased, the soften rate of the heated PET parison can be increased to reduce the needed process time. For example, a patent issued number CN 102153839 B (polyester resin containing tungsten carbide particles and polyester (PET) bottle blank made thereby) disclosed that an IR-absorbing titanium-containing tungsten carbide is added into the Sb catalyst polymerization system to increase the soften rate of the heated parison and improve the temperature uniformity.

Accordingly, how to develop a better PET resin process to increase the solid-state polymerization rate, reduce the process time, and improve the yellowing problem of the PET resin has been considered by the inventors.

SUMMARY

In one aspect, a catalytic composition for preparing a polyethylene terephthalate (PET) resin is provided. The provided catalytic composition can increase solid-state polycondensation rate of PET to shorten the process time and improve the yellowing problem of the obtained PET resin.

Accordingly, a catalytic composition for preparing a PET resin is provided. The catalytic composition comprises a polycondensation catalyst; and cesium tungsten oxide having a chemical formulation of $Cs_xWO_{3-y}Cl_y$, wherein Cs is cesium, Cl is chlorine, W is tungsten, O is oxygen, $0<x\leq1$ and $0\leq y\leq0.5$, and a preferred weight ratio of cesium tungsten oxide to the polycondensation catalyst is 0.005-40.

In another aspect, a PET resin prepared by using the catalytic composition above is also provided. The content of the cesium tungsten oxide is 2-80 ppm, relative to the weight of PET resin.

In one embodiment, the cesium tungsten oxide is in powder form having a diameter of 2-1000 nm.

In another embodiment, the polycondensation catalyst comprises a compound of Ti, Sb or both, such as tetrabutyl titanate.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
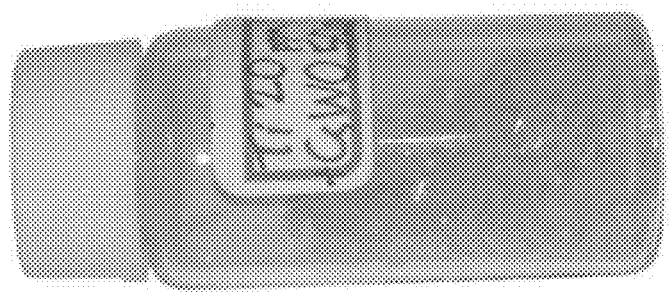
FIG. 1 shows appearances of PET pellets of the examples and the comparative example.
Figure 1:
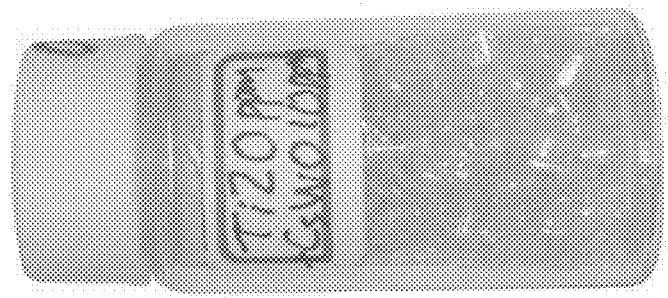
Figure 1:
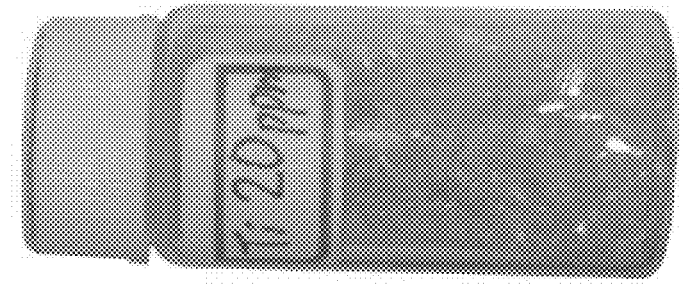

This invention provides a catalytic composition for preparing a PET resin. The catalytic composition comprises a polycondensation catalyst; and cesium tungsten oxide having a chemical formulation of $Cs_xWO_{3-y}Cl_y$, wherein Cs is cesium, Cl is chlorine, W is tungsten, O is oxygen, $0<x\leq1$ and $0\leq y\leq0.5$. The polycondensation catalyst comprises a compound of Ti, Sb or both, such as tetrabutyl titanate. The cesium tungsten oxide particle is powder having a diameter of 2-1000 nm, for example. A preferred weight ratio of cesium tungsten oxide to the polycondensation catalyst is 0.005-40.

In addition, this invention also provides a PET resin prepared by using the catalytic composition above.

Accordingly, in the PET resin made from the catalytic composition above, the content of the cesium tungsten oxide is 2-80 ppm, relative to the PET resin. This catalytic composition can solve the problems of slow solid-state polymerization rate of the PET preparation and thus the long preparation time, as well as yellowing. Moreover, the PET resin can absorb infrared radiation. Therefore, when the PET resin is applied on bottle blowing process heated by IR, the parison can be softened in a shorter heating time to reduce the process time.

The embodiments described below can further proof the practical scope of this invention, but it is not intended to limit the scope of this invention in any forms.

A novel catalytic composition for preparing a PET resin is provided. The catalytic composition comprises a polycondensation catalyst and 2-80 ppm of cesium tungsten oxide, relative to the PET resin. A weight ratio of cesium tungsten oxide to the polycondensation catalyst is 0.005-40. The provided catalytic composition can increase the solid-state polycondensation rate of PET. The obtained PET can absorb IR and improve the yellowing problem.

In this disclosure, three examples are provided to prepare different PET resin for comparing. The three examples are a comparative example, example 1, and example 2. The titanium catalyst used in the comparative example, example 1 and example 2 was tetrabutyl titanate. The addition amount of the titanium catalyst was 20 ppm, relative to the weight of PET resin. The difference is described below. In addition to tetrabutyl titanate, the catalyst used in example 1 further comprised 10 ppm of cesium tungsten oxide, relative to the weight of the PET resin. In addition to tetrabutyl titanate, the catalyst used in the example 2 further comprised 50 ppm of cesium tungsten oxide, relative to the weight of the PET resin. The rest of the polymerization conditions were the same. For example, the polymerization was performed under vacuum. The torque value of the stirrer for stirring the polymerization product was used to determine the polymerization degree. Generally, the torque value is increased with the increase of the polymerization degree. Therefore, the terminated conditions of the polymerization for the comparative example and the examples were set according to the torque value of the stirrer that reached a fixed value. Then, the solid-state polymerization were conducted.

Comparative Example 400 g of bis-2-hydroxy-ethylterephthalate (BHET) monomer and 20 g of ethylene glycol were weighted and put in a reactor. 0.056 g of tetrabutyl titanate (TBT) catalyst and 0.03 g of phosphoric acid were then added. The addition amount of the titanium was 20 ppm, relative to the theoretical weight of the PET. The amount of the phosphoric acid was 24.5 ppm, relative to the theoretical weight of the PET. The reaction temperature was 260° C. After reacting for 10 minutes, the pressure was gradually decreased to 60 mmHg for about 30 minutes. The temperature was then increased to 280° C., and the pressure was further decreased to 1 torr (about 1 mmHg). The reaction was continued until the torque value displayed by the stirrer reached a fixed value. Next, the steps of the solid-state polymerization were described below. 50-100 g of polymerized PET product was placed in a furnace under vacuum, and the temperature was increased from room temperature to 215° C. in about 1 hour. The temperature was then kept at 215° C. for 6 hours. Subsequently, the temperature was decreased to room temperature. The inherent viscosity of the product before and after polymerization was measured by Ostwald viscometer.

Preparation Examples

The preparation of the catalytic composition is as follow. First, the powder of cesium tungsten oxide (from Almighty Green Material Inc., Taiwan) was added into ethylene glycol to prepare an 8.8 wt % solution. Relative to the weight of the powder, 91 wt % of a polymeric type dispersant was then added. 0.5 mm yttrium zirconium beads were used to grind and disperse the mixture above to obtain a nano-disperse liquid. The particle diameter was 91.8 nm measured by a laser particle size analyzer. The dispersion solution and the TBT catalyst (20 ppm, relative to the theoretical weight of PET) were mixed according to the needed concentration to prepare the catalytic composition of this invention. The weight ratio of the cesium tungsten oxide and the polycondensation catalyst was 0.005-40.

Example 1

400 g of BHET monomer and 20 g of ethylene glycol were weighted and put in a reactor. 0.056 g of TBT catalyst (20 ppm, relative to the theoretical weight of the PET), 0.084 g of cesium tungsten oxide dispersion liquid (10 ppm of cesium tungsten oxide, relative to the theoretical weight of the PET), and 0.03 g of phosphoric acid (24.5 ppm, relative to the theoretical weight of the PET) were then added. The reaction temperature was 260° C. After reacting for 10 minutes, the pressure was gradually decreased to 60 mmHg for about 30 minutes. The temperature was then increased to 280° C., and the pressure was further decreased to 1 torr (about 1 mmHg). The reaction was continued until the torque value displayed by the stirrer reached a fixed value. Next, the steps of the solid-state polymerization were described below. 50-100 g of polymerized PET product was placed in a furnace under vacuum, and the temperature was increased from room temperature to 215° C. in about 1 hour. The temperature was then kept at 215° C. for 6 hours. Subsequently, the temperature was decreased to room temperature. The inherent viscosity of the product before and after polymerization was measured by Ostwald viscometer.

Example 2

400 g of BHET monomer and 20 g of ethylene glycol were weighted and put in a reactor. 0.056 g of TBT catalyst (20 ppm, relative to the theoretical weight of the PET), 0.420 g of cesium tungsten oxide dispersion liquid (50 ppm of cesium tungsten oxide, relative to the theoretical weight of the PET), and 0.03 g of phosphoric acid (24.5 ppm, relative to the theoretical weight of the PET) were then added. The reaction temperature was 260° C. After reacting for 10 minutes, the pressure was gradually decreased to 60 mmHg for about 30 minutes. The temperature was then increased to 280° C., and the pressure was further decreased to 1 torr (about 1 mmHg). The reaction was continued until the torque value displayed by the stirrer reached a fixed value. Next, the steps of the solid-state polymerization were described below. 50-100 g of polymerized PET product was placed in a furnace under vacuum, and the temperature was increased from room temperature to 215° C. in about 1 hour. The temperature was then kept at 215° C. for 6 hours. Subsequently, the temperature was decreased to room temperature. The inherent viscosity of the product before and after polymerization was measured by Ostwald viscometer.

The measuring method of the inherent viscosity refers to the ISO 1628 test standard, "Plastics—Determination of the viscosity of polymers in dilute solution using capillary viscometers." Here, an Ostwald viscometer was used. The details of the measuring are described to below.

(1) Sample preparation: Concentration was 0.3 g/dL. 0.0300 g of sample was precisely weighted and dissolved in 10 mL of solvent. The solvent was phenol/1,1,2,2-trichloroethylene (TCE)=6/4. The allowable error of the sample weight was 0.0001 g. The prepared sample was heated at about 80° C. to be dissolved. After completely dissolved, the sample solution was stayed at room temperature to be cooled down.

(2) The temperature of a thermotank was set to 30° C. and stayed at 30° C. for at least 1 hour.

(3) to was obtained by blank test: 10 mL of phenol/TCE (6/4) was injected into a viscometer and then placed in the thermotank for 5 minutes. The measurements were performed for at least three times, and the error could not be greater than 0.3 seconds. If the error was too large, the measurements were redone.

(4) 10 mL of the sample solution was injected into the viscometer and then placed in the thermotank for 5 minutes. The measurements were performed for at least three times, and the error could not be greater than 0.3 seconds. Then t could be obtained by averaging the measured to values above.

(5) The values of $t_0$ and t were taken in to the equation below to obtain the inherent viscosity (IV).

$$\text{Inherent viscosity } (IV) = \frac{\ln\left(\frac{\eta_{Sample}}{\eta_{Blank}}\right)}{\text{Polymer concentration}\left(\frac{g}{dL}\right)} = \frac{t/t_0}{0.3}$$

The IV values of the comparative example, example 1, and example 2 are listed in table 1. In table 1, the IV difference before and after the solid-state polymerization of example 1 (0.20 dL/g) and example 2 (0.18 dL/g) were obviously greater than that of the comparative example (0.12 dL/g).

TABLE 1

| Items | Comparative example | Example 1 | Example 2 |
|---|---|---|---|
| Catalyst | 20 ppm TBT | 20 ppm TBT + 10 ppm $Cs_xWO_{3-y}Cl_y$ | 20 ppm TBT + 50 ppm $Cs_xWO_{3-y}Cl_y$ |
| Polymerization time | 2 h 55 m | 2 h 35 m | 3 h 10 m |
| Solid-state polymerization time | 6 h | 6 h | 6 h |
| Solid-state polymerization temperature | 215° C. | 215° C. | 215° C. |
| IV before solid-state polymerization (dL/g) | 0.68 | 0.69 | 0.71 |
| IV after solid-state polymerization (dL/g) | 0.80 | 0.87 | 0.91 |
| IV difference (dL/g) | 0.12 | 0.18 | 0.20 |

The PET pellets after solid-state polymerization was put in a sample vial and further placed on a white background to take photographs, as shown in FIG. 1. In FIG. 1, the yellowing degree of the comparative example (the catalyst contains TBT only) is more obvious than the examples 1 and 2.

For further verification, the PET pellets of the comparative example and the examples were thermocompressed into PET films having a thickness of 0.5 mm under 250° C. The color coordinates of the obtained PET films were measured by Hunter Lab Universal Color Quest XE. Please refer ASTM E313: "Standard Practice for Calculating Yellowness and Whiteness Indices from Instrumentally Measured Color Coordinates." The measured yellowness indexes (Y.I.) were listed in table 2 below. In table 2, the Y.I. was decreased as the content of the cesium tungsten oxide was increased. This result is consistent with the results shown in FIG. 1. That is, the color of the PET pellets of the example 2 is less yellow than the color of the comparative example.

Figure 2:
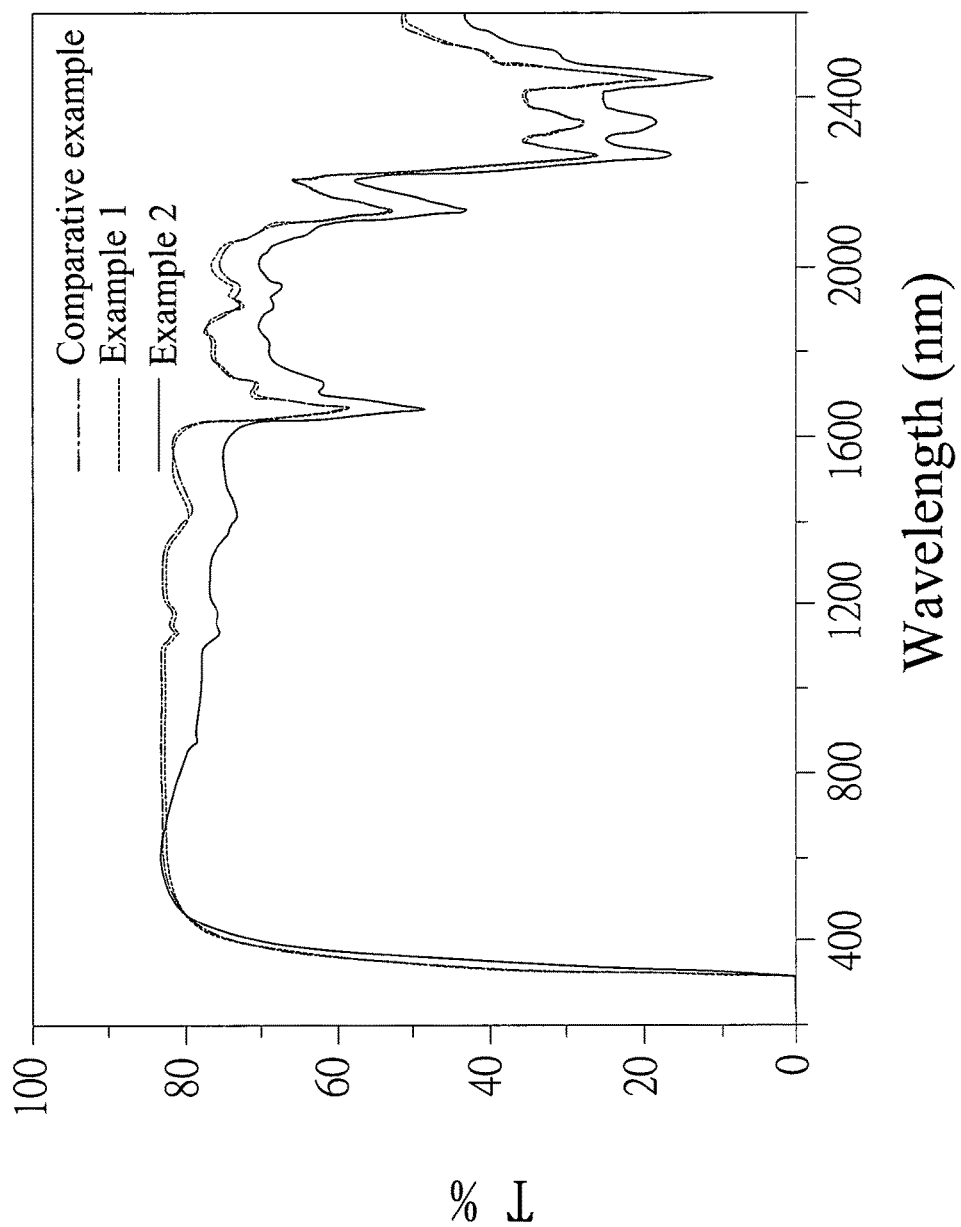
FIG. 2 is a UV/VIS/IR transmission spectrum of a PET film according to one embodiment of this invention.

FIG. 2 is a transmittance spectrum of the PET films above measured by UV/VIS/IR spectrometer (SHIMAZU UV3600). The transmittance of the visible light (Tvis) and infrared (Tir) was calculated by ISO 9050 and listed in table 2. In table 2, under the similar visible light transmittance (Tvis, about 82%), the IR absorption of the example 1 (10 ppm of cesium tungsten oxide) was 0.4% more than the comparative example, and the IR absorption of the example 2 (50 ppm of cesium tungsten oxide) was 5.3% more than the comparative example. Therefore, the catalytic composition of this invention can absorb IR having a wavelength greater than 780 nm. This function can increase the soften rate of the heated parison in the back-end blowing process.

Moreover, light irradiation was used to simulate the conditions of the PET bottle blowing process to see whether the temperature of the example 2 added by 50 ppm of cesium tungsten oxide would be higher. Since the halogen lamps can be obtained more easily, and the emitted wavelength distribution of halogen lamps is close to the emitted wavelength distribution of the heating light source of the bottle blowing process, a 250 W halogen lamp was used to continuously irradiate samples for 10 minutes at a distance of 8.5 cm. The temperatures of the samples were recorded before and after the halogen-lamp irradiation. The results are listed in table 2. In table 2, the 10-minute temperature difference ($\Delta T$) is 60.8° C. for the example 2, added with 50 ppm cesium tungsten oxide. Comparing with the comparative example ($\Delta T$=51.4° C.), without being added with cesium tungsten oxide, the 10-minute temperature difference of the example 2 is 9.4° C. more than that of the comparative example. This result could proof that the catalytic composition of this invention can absorb IR with a wavelength more than 780 nm. Therefore, when the obtained PET resin is used in the bottle blowing process using IR heating, the soften rate of the heated parison can be shortened to decrease the process time and increase the production rate.

TABLE 2

| Items | | Comparative example | Example 1 | Example 2 |
|---|---|---|---|---|
| Y.I. | | 2.39 | 1.48 | −0.13 |
| Tvis (%) | | 82.2 | 82.0 | 82.4 |
| Tir (%) | | 79.5 | 79.1 | 74.2 |
| Surface temperature of PET films* | $T_0$ (° C.) | 24.3 | 25.2 | 25.4 |
| | $T_{10\,min}$ (° C.) | 75.7 | 76.7 | 86.2 |
| | $\Delta T$ (° C.) | 51.4 | 51.5 | 60.8 |

*Irradiated by a halogen lamp.

What is claimed is:

1. A polyethylene terephthalate (PET) resin comprising 2-50 ppm cesium tungsten oxide having a chemical formulation of $Cs_xWO_{3-y}Cl_y$, wherein $0<x\leq1$ and $0\leq y\leq0.5$.

2. The PET resin of claim 1, wherein the cesium tungsten oxide is in a powder form having a diameter of 2-1000 nm.

* * * * *